US007925677B2

(12) United States Patent
Sheridan

(10) Patent No.: US 7,925,677 B2
(45) Date of Patent: Apr. 12, 2011

(54) GEOGRAPHIC FEATURE NAME REDUCTION USING PHONETIC ALGORITHMS

(75) Inventor: Jesse Sheridan, Lyme, NH (US)

(73) Assignee: Tele Atlas North America, Inc., Lebanon, NH (US)

( * ) Notice: Subject to any disclaimer, the term of this patent is extended or adjusted under 35 U.S.C. 154(b) by 207 days.

(21) Appl. No.: 11/377,764

(22) Filed: Mar. 16, 2006

(65) Prior Publication Data

US 2007/0239460 A1 Oct. 11, 2007

(51) Int. Cl.
*G06F 17/30* (2006.01)
*G06F 7/00* (2006.01)
(52) U.S. Cl. ........ 707/803; 704/243; 704/246; 704/251; 707/692; 707/752; 707/919; 715/257
(58) Field of Classification Search .................. None
See application file for complete search history.

(56) References Cited

U.S. PATENT DOCUMENTS

| 5,329,608 | A | * | 7/1994 | Bocchieri et al. | 704/243 |
|---|---|---|---|---|---|
| 5,680,628 | A | | 10/1997 | Carus et al. | |
| 6,081,803 | A | * | 6/2000 | Ashby et al. | 707/4 |
| 6,487,495 | B1 | * | 11/2002 | Gale et al. | 701/209 |
| 7,197,500 | B1 | * | 3/2007 | Israni et al. | 707/100 |
| 2003/0220734 | A1 | * | 11/2003 | Harrison et al. | 701/208 |
| 2004/0054679 | A1 | * | 3/2004 | Ralston | 707/100 |
| 2006/0101005 | A1 | * | 5/2006 | Yang et al. | 707/3 |

OTHER PUBLICATIONS

Poole, David, Dealing with Addresses, Jan. 7, 2003, http://www.sqlservercentral.com/articles/Miscellaneous/dealingwithaddresses/1028 pp. 1-2.*
Axelrod, Amittai, on building a high performance gazetteer database, May 31, 2003, Part of Workshop on Analysis of Geographic References, pp. 1-6.*
International Search Report for PCT/US07/62896, dated Sep. 4, 2008, 11 pages.
Axelrod, "On Building a High Performance Gazetteer Database", May 31, 2003, 6 pages.

* cited by examiner

*Primary Examiner* — Tony Mahmoudi
*Assistant Examiner* — James J Wilcox
(74) *Attorney, Agent, or Firm* — Harness, Dickey & Pierce, P.L.C.

(57) ABSTRACT

Embodiments of the present invention concern a way of using geographic-phonetic strings, such as modified geographic-phonetic strings, for constructing a geographic database for use with geographic applications.

30 Claims, 8 Drawing Sheets

GEOGRAPHIC FEATURE NAME REDUCTION USING PHONETIC ALGORITHMS

BACKGROUND OF INVENTION

The present invention relates to geographic applications which operate using a geographic database.

Geographic databases can contain geographic data which allows the geographic application to provide geographic information to the user. For example, the geographic database can be used to create a digital map or directions in response to a user query. The accuracy of the digital map and directions constructed by the geographic application are limited by the accuracy of the geographic data in the geographic database.

SUMMARY OF INVENTION

Embodiments of the present invention, concern ways to improve the quality of geographic data in a geographic database. In one embodiment, geographic names are converted into geographic-phonetic strings so as to remove typos or otherwise duplicative geographic names from the geographic database.

In one embodiment, geographic names with the same geographic-phonetic string that are at least partially co-located can be analyzed to determine a preferred geographic name. This preferred geographic name can be then provided to a user by the geographic application.

In one embodiment, the geographic-phonetic string can be a modified phonetic representation tailored for use with geographic applications.

DETAILED DESCRIPTION

Figure 1:
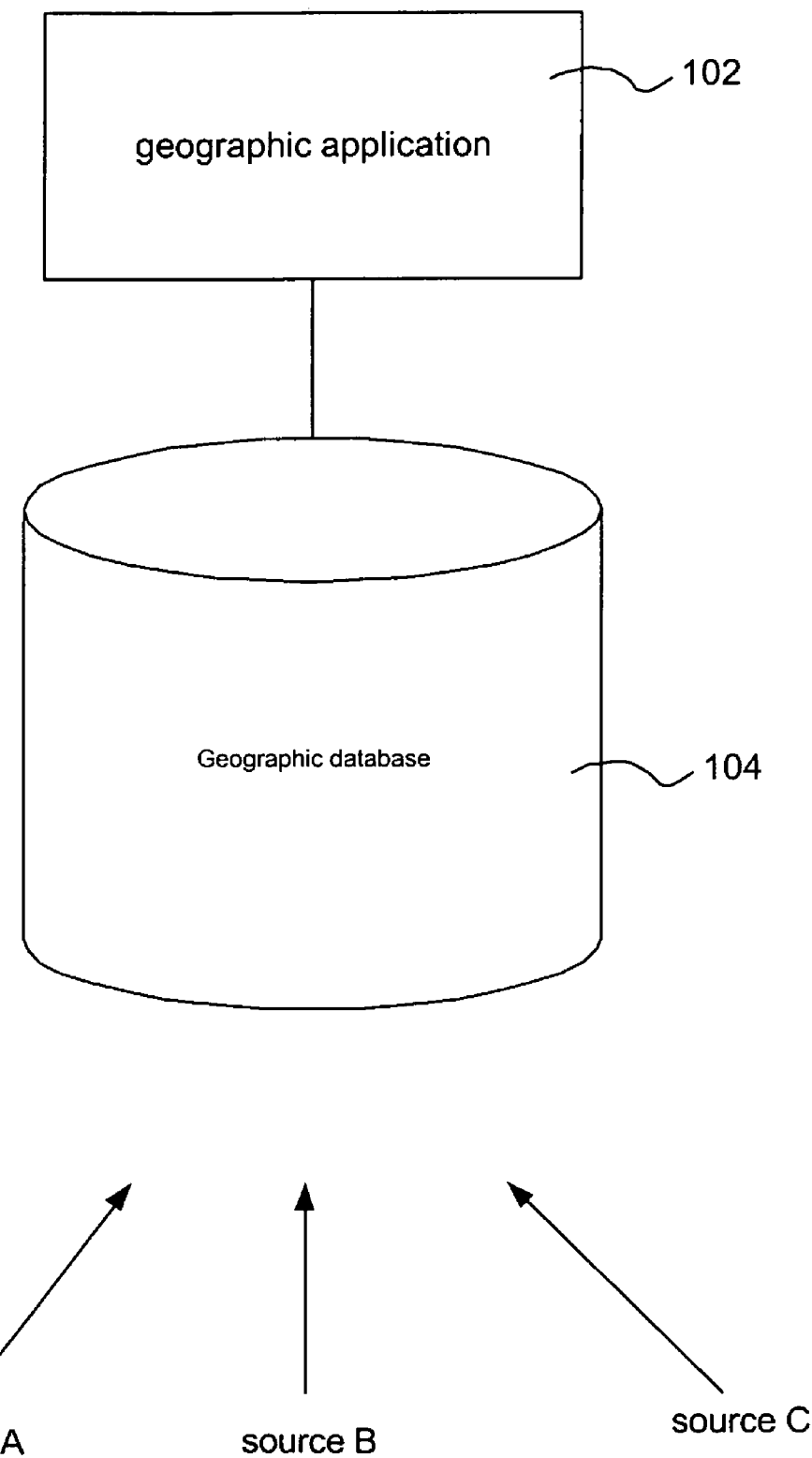
FIG. 1 illustrates an example of a geographic application which operates using a geographic database.

FIG. 1 illustrates an example of a geographic application 102 which operates using a geographic database 104. The geographic database 104 can indicate geographic names, such as street names, park names, building names, city names, state names and the like. In the example of FIG. 1, the geographic database 104 can be populated with geographic data from multiple sources. The geographic database 104 can be any type of memory to store the geographic data.

Typically, the geographic data includes names associated with location information. For example, streets can be associated with location information including starting and end points, cross street names and coordinate positions. The geographic data in the geographic database 104 can be used by the geographic application 102 to produce an output for the user. The user output can be in a list, text, graphical display such as a map or video, audio such as speech, or other type of output. The geographic application 102 can be a mapping program, a navigation program or the like.

Alternate name terms for the same geographic feature can often be output by the geographic application. This can be desirable when the terms are true alternates. For example, a stretch of highway 100 within a town could also be called Elm Street. In that example, it would make sense for the geographic application to provide the alternate name to the user.

Figure 2:
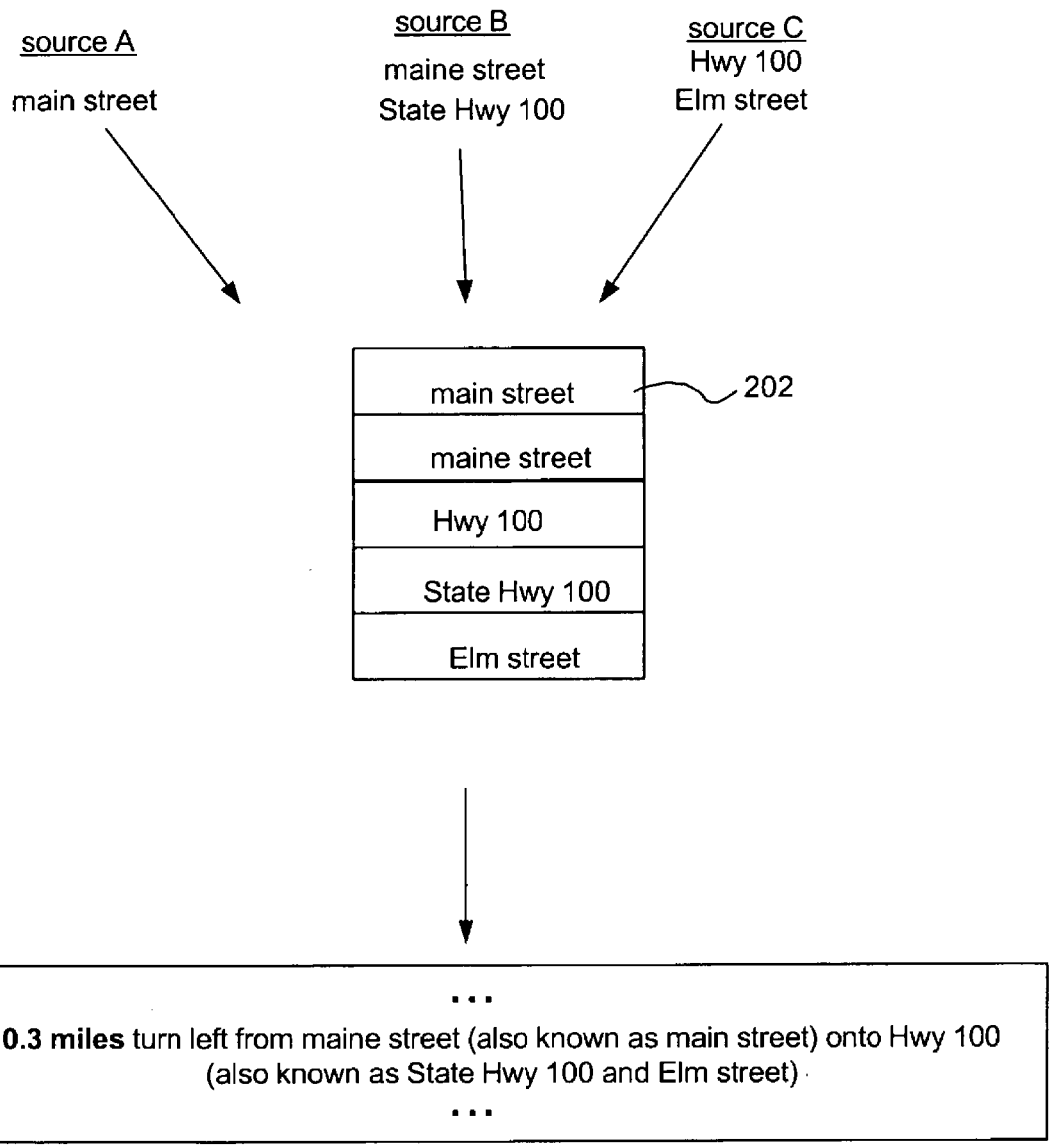
FIG. 2 illustrates a geographic database populated from multiple sources.

As shown in FIG. 2, in one embodiment, a geographic database can be populated from multiple different sources. In the example of FIG. 2, the database fragment 202 includes alternate terms for the same geographic feature. In this example, the alternate terms include typographic or other errors from one or more of the sources. For example, source A gives a certain street as "Main street" while source B gives the same street as "Maine street".

Embodiments of the present invention, convert geographic names into a geographic-phonetic strings so as to remove typos or otherwise duplicative geographic names.

In one embodiment, the geographic-phonetic string is a phonetic representation of all or a portion of the geographic name. The geographic phonetic representation can be a phonetic representation of an intermediate name constructed from all or a portion of the geographic name. The geographic-phonetic strings can be created such that related geographic names get the same geographic-phonetic string. For example, the geographic-phonetic representation can be a numeric or alpha numeral string for geographic names including for original or cardinal number words.

Figure 3:
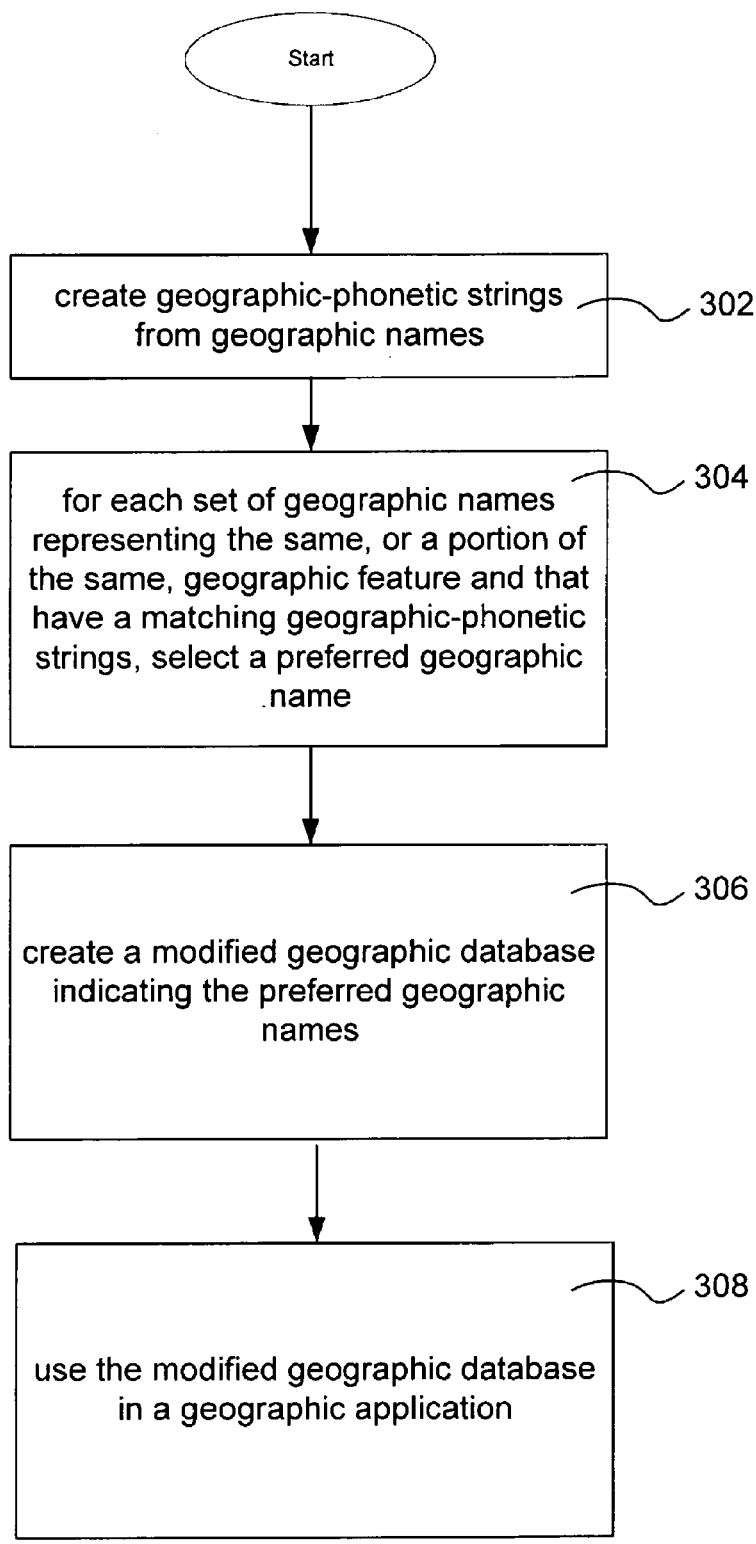
FIG. 3 illustrates the operation of one embodiment of the present invention.

FIG. 3 illustrates the operation of one embodiment of the present invention. In step 302, geographic-phonetic strings are created for the geographic names. In step 304, sets of geographic names for the same or a portion of the same geographic features can be checked to see whether their geographic-phonetic strings match. For each set of geographic names containing the same or portion of the same geographic feature that has a matching geographic-phonetic string, a preferred geographic name is selected. This step can thus remove some of the duplicative names from the geographic database.

Determining the sets of geographic names that represent the same or a portion of the same geographic feature can be done in any manner, including conventional algorithms. For example, the geographic database can include coordinate or cross-street information that can allow a system to determine that the geographic features overlap. Such determinations can be similar to the determinations made by the geographic applications which provide the alternate name information to a user.

A preferred geographic name of the name list can be selected for each set of geographic-phonetic string matches and feature overlaps. The sources of the names can be used to select a preferred name. In one example, names from street signs can be considered to be more reliable than names obtained from the U.S. Post Office, which can be considered to be more reliable than names obtained from surveys or other sources. The preferred name can be selected based on metadata which can indicate the source and/or other indications of the reliability of each alternate name.

In one embodiment, in step 306 modified geographic databases are created indicating the preferred geographic names. In step 308, this modified geographic database can be used in a geographic application.

Figure 4:
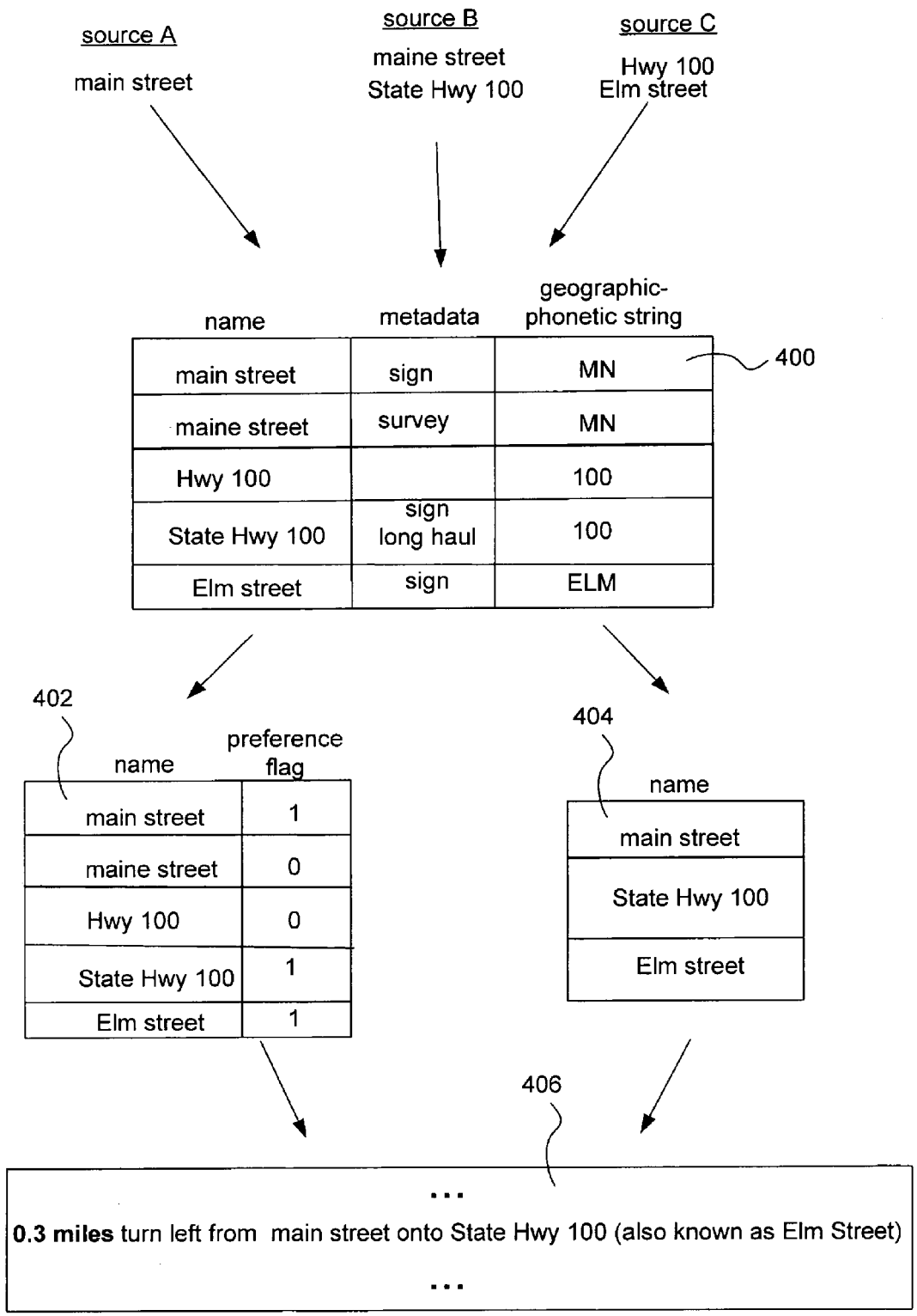
FIG. 4 illustrates a method of one embodiment of the present invention using a geographic-phonetic strings.

FIG. 4 illustrates an example of such a system. Information concerning geographic features including geographic names can be obtained from multiple different sources. In the database fragment 400 representing two geographic features, each of the geographic names corresponding to the same geographic feature can have an associated geographic-phonetic string.

In the case shown in FIG. 4, the same geographic feature can be described by the terms "Main Street" and "Maine Street". Another geographic feature is described by the terms "Highway 100", "State Hwy 100" and "Elm Street". In one embodiment, a geographic-phonetic string for each alternate name of these groups is created. In the example of FIG. 4, "Main Street" and "Maine Street" can have the same geographic-phonetic string, and "Highway 100" and "State highway 100" can have the same geographic-phonetic string. However, the geographic-phonetic string for "Elm Street" does not match the geographic-phonetic string for "Highway 100" and "State highway 100" so it is considered a valid alternate name.

In one embodiment, the geographic database associated with the geographic application need not include the geographic-phonetic string. FIG. 4 shows two modified geographic databases constructed using geographic-phonetic strings that do not include the phonetic representations. In one embodiment, a preference flag is used to show geographic names that are determined to be non-duplicative. This is shown in the modified geographic database fragment 402. The geographic database fragment 404 does not include the non-preferred geographic name entries. Either modified database 402 or 404 can be used with a geographic application to produce a user output 406 without the duplicative names.

Figure 5:
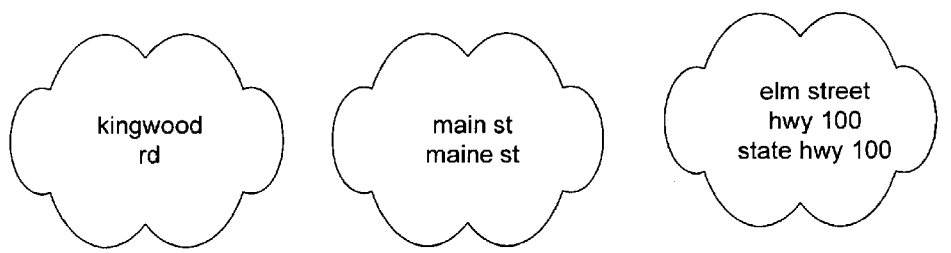
FIG. 5 illustrates an example of the operation of a method of the present invention.
Figure 5:
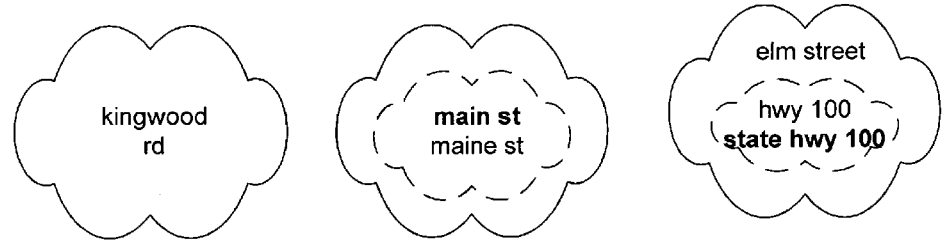
Figure 5:
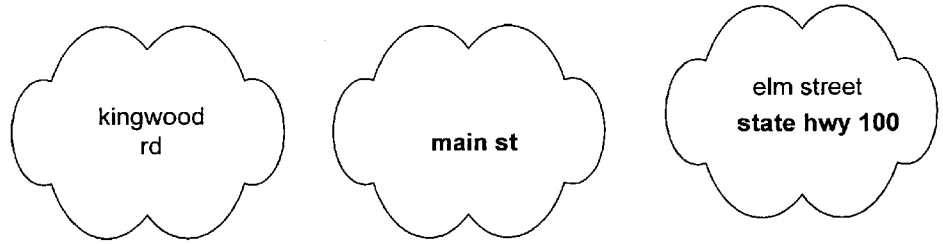

FIG. 5 illustrates another view of the grouping method. A list of names is shown in step 1. In step 2, the names are grouped together by geographic location. In step 3, each of the geographic names in a set which have the same geographic-phonetic string are determined as shown by the dotted lines. It is possible that a location group (solid line group) has multiple phonetic match groups (dotted line groups). In step 4, a preferred geographic name (bold) for the names in each dotted line group can be determined.

In one embodiment, a geographic database can be constructed using the steps of creating a geographic-phonetic string for geographic names, determining sets of geographic names that are associated with the same or a portion of the same geographic feature and that have the same geographic-phonetic string, such as the dotted line groups of FIG. 5, and selecting a preferred geographic name for the set. Such a geographic database would be different from a database not constructed using the geographic-phonetic string. The modified geographic database can be used for the geographic application, such as a mapping or directions-giving application.

The geographic-phonetic strings can be produced in part or in whole by using a phonetic algorithm such as but not limited to soundex, metaphone and double metaphone. Soundex and metaphone use a single phonetic representation associated with each name. In double metaphone, multiple phonetic representations can be associated with each name. Double metaphone works well for names, such as names imported from another language, that can have two different pronunciations.

Geographic-phonetic strings can be used to remove duplicate names caused by typos and the like. Geographic-phonetic strings are especially effective in removing typos that are produced by people who write down the name based upon how the name sounds. Such typos tend to be quite common.

In one embodiment, the geographic-phonetic strings can be modified phonetic representations or alternate type (such as numeric or alphanumeric representations). Such modified phonetic or alternate representations can be tailored for use with geographic applications.

One embodiment of the present invention includes a step which includes modifying at least some geographic names to intermediate names and creating phonetic representation of the intermediate names.

In one embodiment, a number of options can be selected. Exemplary option can include:
1) What string to run on? If you choose to only look at the name body one can effectively ignore the type (Avenue, Street, etc.) This means that, for example "Smith Avenue" will have the same geographic-phonetic string as "Smith Street".
2) Treat ordinals as cardinals?
3) Treat spelled numbers as numerals?
4) Treat lone number references to cardinals ("thousand" to "1000", without leading "one")?
5) Allow repetition and non-standard use of powers of 10 multipliers (one thousand hundred=one hundred thousand)?

Once these options are set, the software can run and return one or two Geographic-phonetic strings. In one embodiment, the phonetic logic can set these as the dominant and secondary phonetic variants respectively for strings without numeric words. Strings with ordinal or spelled ordinal words can get the ordinal as primary and the cardinal as secondary. Strings with cardinal words can get the cardinal as primary and no secondary.

Figure 6:
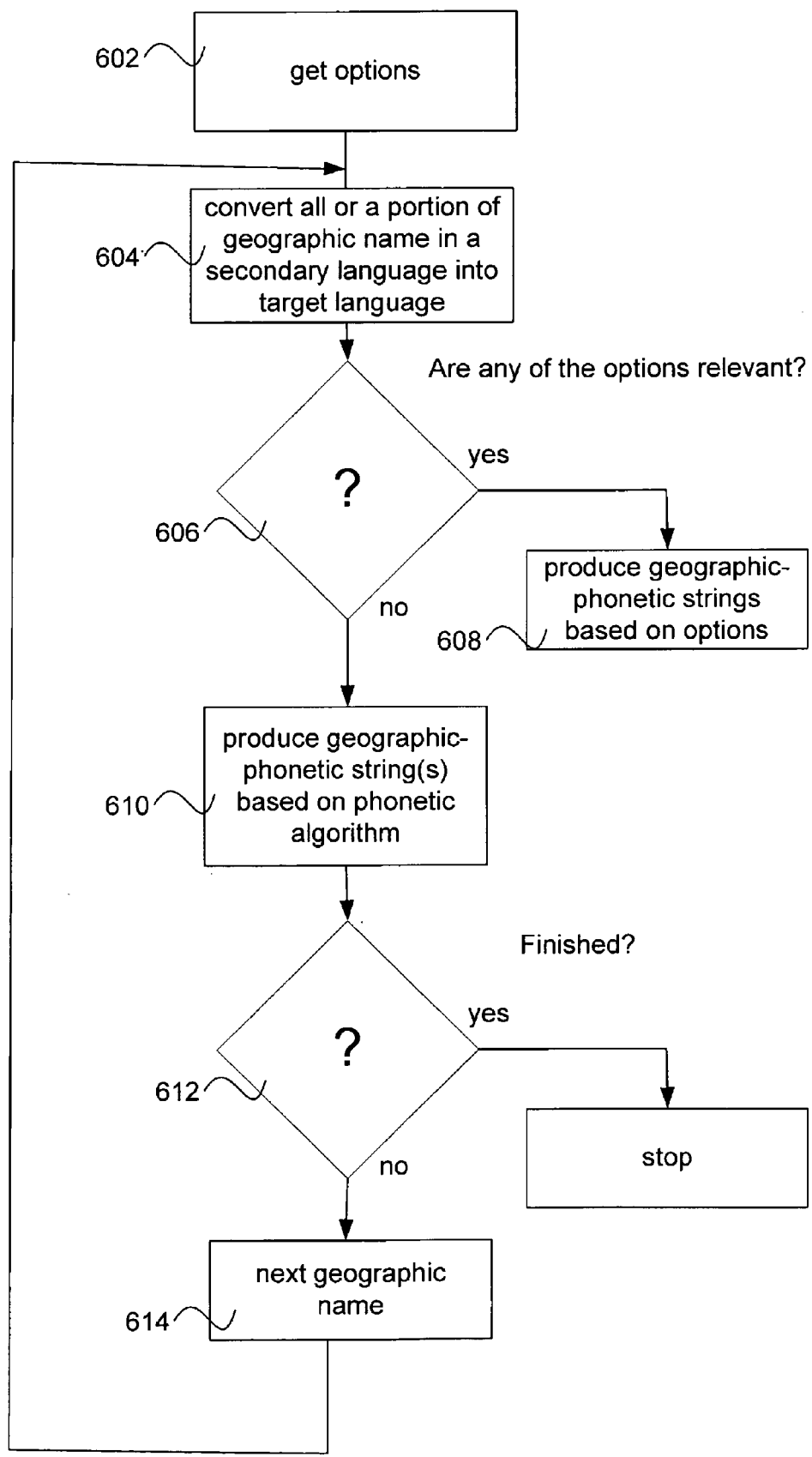
FIG. 6 is a flow chart illustrating the operation of a method of the present invention.

FIG. 6 illustrates an example of one embodiment of a flow chart of a method for constructing modified phonetic representations.

In step 602, the options for the construction of the geographic phonetic strings are obtained from a user. In optional step 604, all or a portion of any geographic name in a secondary language is converted into a target language. The program can use a list of words in the secondary language with associated target language equivalents or can use a translation program. Typically, the target language can be English, but any language can be used as a target language.

In step 606, it is tested whether any options are relevant to the geographic name. If so the geographic-phonetic strings can be produced based on the options in step 608. For example, in one option, if the geographic name or intermediate name includes a term for a type of feature, such as a street, road, avenue, highway, state highway and the like, this term can be ignored to create the updated intermediate name. If the geographic name includes ordinal and/or spelled numbers to be converted to a numeric representation, these numbers can be so converted. If no options are relevant, in step 610, geographic-phonetic string(s) can be produced based on a phonetic algorithm.

Step 612 checks whether the process is finished. If not, in step 614, a new geographic name is obtained and the process repeats.

Figures 7A, 7B:
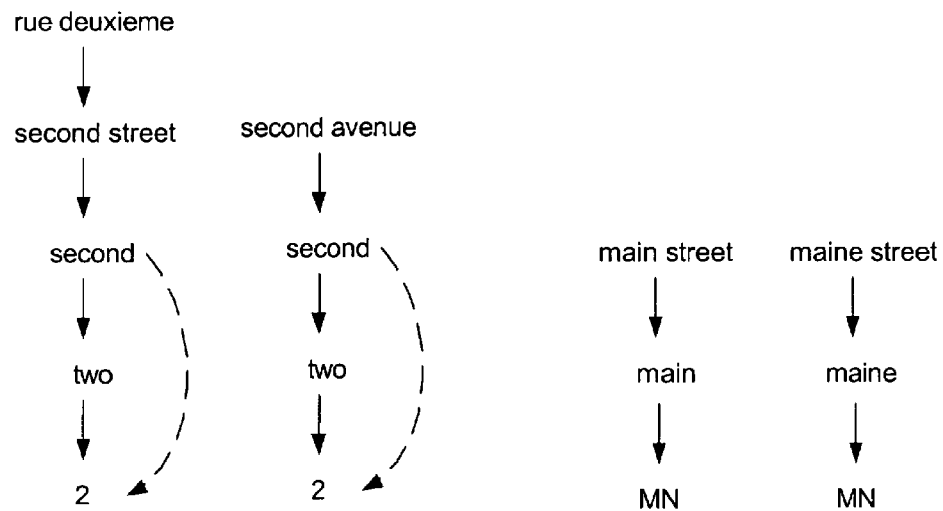
FIG. 7 is diagram illustrating examples of geographic-phonetic strings of the present invention.
Figures 7C, 7D, 7E:
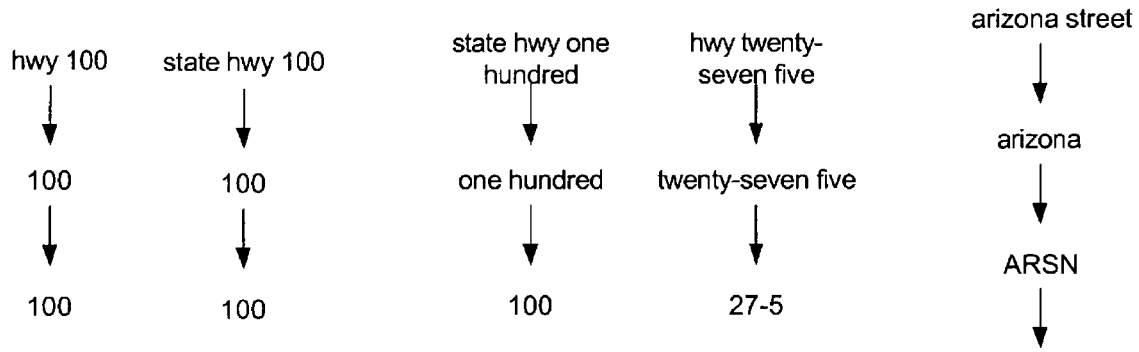

FIG. 7 illustrates examples of the operation of the production of geographic-phonetic strings of one embodiment. FIG. 7A, illustrates a case in which a geographic name "rue deuxieme" is converted into the target language English, to produce the intermediate term "Second Street", the term "street" is ignored to produce the intermediate term "Second" which can be converted directly or indirectly to the numeric representation "2". FIG. 7B illustrates a case in which the terms "Maine street" and "Main street" are converted into the geographic-phonetic string "MN". FIG. 7C illustrates a case in which the terms "hwy 100" and "state hwy 100" are converted to the numeric representation "100".

FIG. 7D illustrates a case where the system needs to determine whether the term is converted to a single number, numeric representation or a multiple numeric representation. In one example, the term "state highway one-hundred" is converted to the numeric representation "100". In some cases it is desirable that a term such as "highway twenty-seven five" be converted into a representation such as "27-5", rather than the combined representation of "275". Such conversions can be selectable by a user.

FIG. 7E illustrates a case in which the length of the geographic-phonetic string is limited. In this example, the length of the geographic-phonetic string is limited to 3 characters.

In one embodiment, alphanumeric representations can be used for some street names. such as:

| Rec | Name | geographic-phonetic string |
|---|---|---|
| 1 | United States Hwy 6B | 6B |
| 2 | US Hwy 10 | 10 |
| 3 | Hwy 6B | 6B |
| 4 | Maryland 6B | 6B |

Note that even though the various representations of Highway 6B are not phonetically similar ("Maryland Six Bee" isn't very similar to "Highway Six Bee"), they share a common geographic-phonetic string due to their route number reference.

One embodiment of the present invention uses code to interface with a conventional phonetic algorithm to produce the modified phonetic algorithm. The code can be a script, such as a PERL script. In one embodiment, a PERL script is used to ignore such as "street", "avenue", "state highway", "Maryland" from the name, convert terms into a target language, as well as providing selectable features. The selectable features can include selectably converting ordinals to cardinals, such as the conversion of "tenth" to ten; selectably converting spelled word numbers to cardinal, such as "twelve" to "12"; and selectably determining whether to combine two number terms.

One embodiment of the present invention is a method comprising modifying at least some of the geographic names to create intermediate names and creating phonetic representation of the intermediate names. This method can be used to create a geographic database.

The method can also be used to access a geographic database in a geographic application. For example, a modified phonetic representation can be created from a users verbal input and this representation used to look up data in the geographic database.

Figure 8:
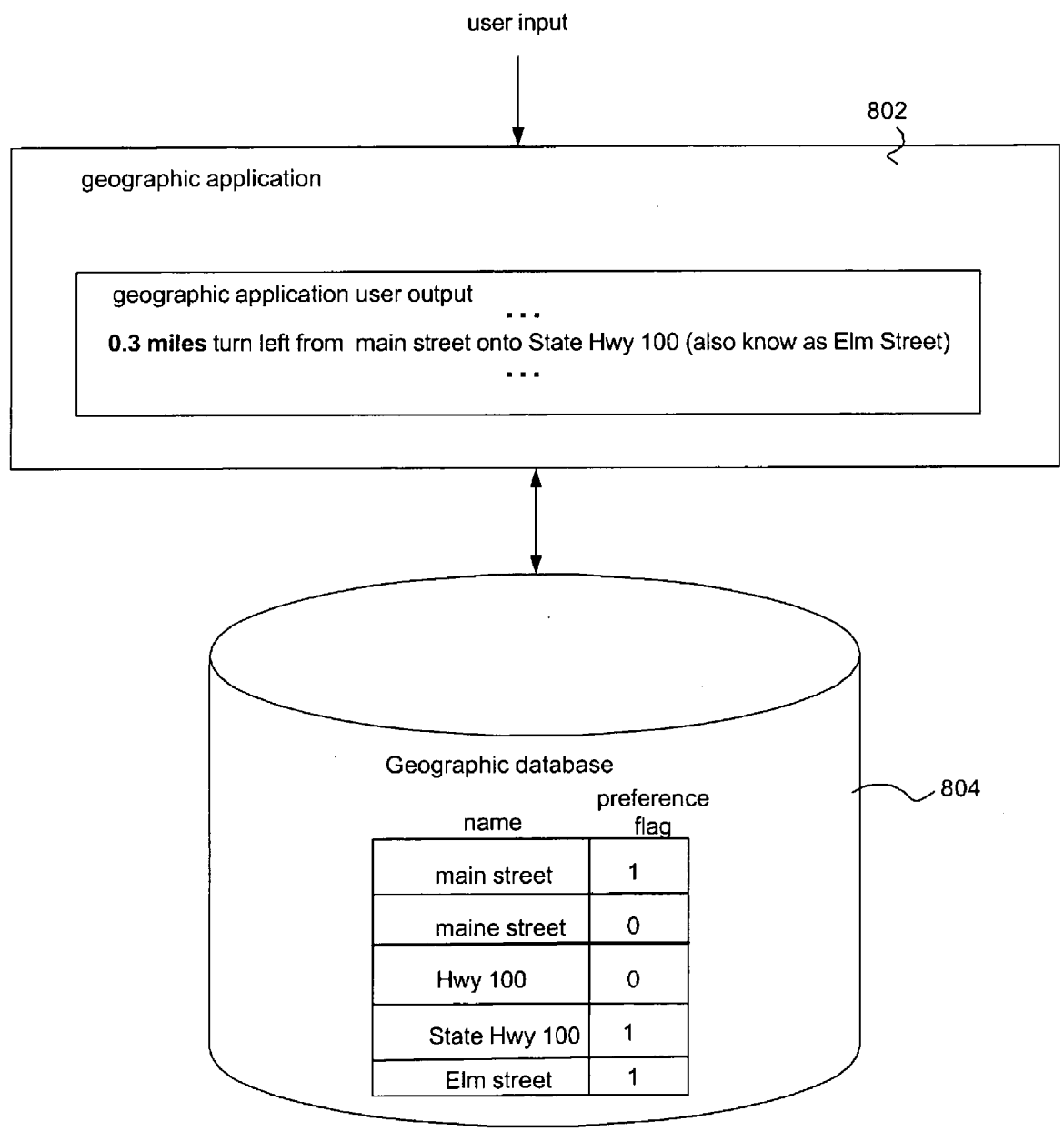
FIG. 8 shows an example with an application that uses a geographic database constructed using geographic-phonetic string comparisons.

FIG. 8 shows an example with an application 802 that uses a geographic database 804 constructed using geographic-phonetic string comparisons. In one embodiment, a system comprises a geographic database 804 constructed using the steps of creating geographic-phonetic strings for geographic names, determining sets of the geographic names that are associated with the same, or a portion of the same, geographic feature and that have the same geographic-phonetic string and selecting preferred geographic names for the sets. The system can also include an application 802 that uses the geographic database to provide a user output, the user output including a preferred geographic name that is a member of one of the sets and not including another geographic name that is also a member of the one of the sets.

The user output can be in a list, text, visual, such as graphical, display such as a map or video, audio such as speech, or other type of output. Audio output can be produced using phonetic information. Many GIS, Internet and Navigation applications can use this invention. These applications include geocoding applications (text/list based), routing/directions applications (graphical/list/speech based) and graphical-based display applications. The applications can include navigation, internet-based and Geographical Information Systems (GIS) among others.

The application can be a mapping program, a navigation program or some other type of program. The preferred geographic names for the sets can be indicated in the database. Alternately, the non-preferred geographic names can be removed from the database.

The foregoing description of preferred embodiments of the present invention has been provided for the purposes of illustration and description. It is not intended to be exhaustive or to limit the invention to the precise forms disclosed. Many embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A method of modifying a geographic database comprising:
   obtaining, from the geographic database, a set of geographic names associated with the same, or a portion of the same geographic feature,
   creating geographic-phonetic strings for the geographic names;
   determining a subset of the set of geographic names, the subset including geographic names that are both associated with the same, or a portion of the same, geographic feature and that have the same geographic-phonetic string so as to remove typographical errors and duplicative geographic names from the set of geographic names; and
   selecting a preferred geographic name for the subset and modifying the geographic database to preferentially flag the preferred geographic name so selected, as compared to the geographic names not so selected, wherein the determining of the subset uses the geographic-phonetic strings.

2. The method of claim 1, further comprising compiling geographic information including the geographic names from different sources.

3. The method of claim 1, wherein the selecting step includes using metadata associated with the geographic names.

4. The method of claim 1, wherein the creating step includes modifying at least some of the geographic names to create intermediate names; and creating geographic-phonetic strings of the intermediate name.

5. The method of claim 4, wherein the modifying step includes converting all or part of a geographic name into a target language.

6. The method of claim 4, wherein the modifying step includes ignoring a portion of a geographic name.

7. The method of claim 1, wherein the converting step includes producing at least some numeric representations.

8. A computer readable storage medium storing code to implement a method of modifying a geographic database comprising the steps of:

obtaining a set of geographic names, from the geographic database, associated with the same, or a portion of the same geographic feature;

creating geographic-phonetic strings for the geographic names;

determining a subset of the geographic names, the subset including geographic names that are both associated with the same, or a portion of the same, geographic feature and that have the same geographic-phonetic string so as to remove typographical errors and duplicative geographic names from the set of geographic names; and selecting a preferred geographic name for the subset and modifying the geographic database to flag the preferred geographic name so selected preferentially as compared to the geographic names not so selected, wherein the determining of the subset uses the geographic-phonetic strings.

9. The computer readable storage medium of claim 8, further comprising compiling geographic information including the geographic names from different sources.

10. The computer readable storage medium of claim 8, wherein the selecting step includes using meta data associated with the geographic names.

11. The computer readable storage medium of claim 8, wherein the creating step includes modifying at least some of the geographic names to create intermediate names; and creating geographic-phonetic strings of the intermediate names.

12. The computer readable storage medium of claim 11, wherein the modifying step includes converting all or part of a geographic name into a target language.

13. The computer readable storage medium of claim 11, wherein the modifying step includes stripping away a portion of a geographic name.

14. The computer readable storage medium of claim 8, wherein the converting step includes producing at least some numeric representations.

15. The method of claim 1, further comprising: modifying at least some of the geographic names to create intermediate names; and creating geographic-phonetic strings of the intermediate names.

16. The method of claim 15, wherein the modifying comprises converting all or part of a geographic name into a target language.

17. The method of claim 15, wherein the modifying comprises ignoring a portion of a geographic name.

18. The method of claim 17, wherein the stripping away comprises removing at least one word indicating a type of feature.

19. The method of claim 18, wherein the type of feature is a road.

20. The method of claim 19 wherein the type of feature is a geographic area.

21. The method of claim 15, wherein the modifying comprises converting an ordinal number to a cardinal number.

22. The method of claim 15, wherein the modifying comprises converting a spelled out number to a numeric representation.

23. The method of claim 15, wherein the method includes determining whether two numbers in the geographic name are to be combined.

24. The method of claim 15, wherein some of the geographic-phonetic strings are numeric representations.

25. The method of claim 15, wherein some of the geographic-phonetic strings are alphanumeric representations.

26. The method of claim 15, further comprising determining sets of the geographic names that are associated with the same, or a portion of the same, geographic feature and that have the same geographic-phonetic string.

27. The method of claim 26, wherein further comprising selecting preferred geographic names for the sets.

28. The method of claim 15, wherein the method is used to create a geographic database.

29. The method of claim 15, wherein the method is used to access a geographic database.

30. The method of claim 15, wherein the method is used as part of a geographic application.

* * * * *